Nov. 16, 1937.   R. H. GARNER   2,099,266
DRAFTING MACHINE
Filed Jan. 27, 1936
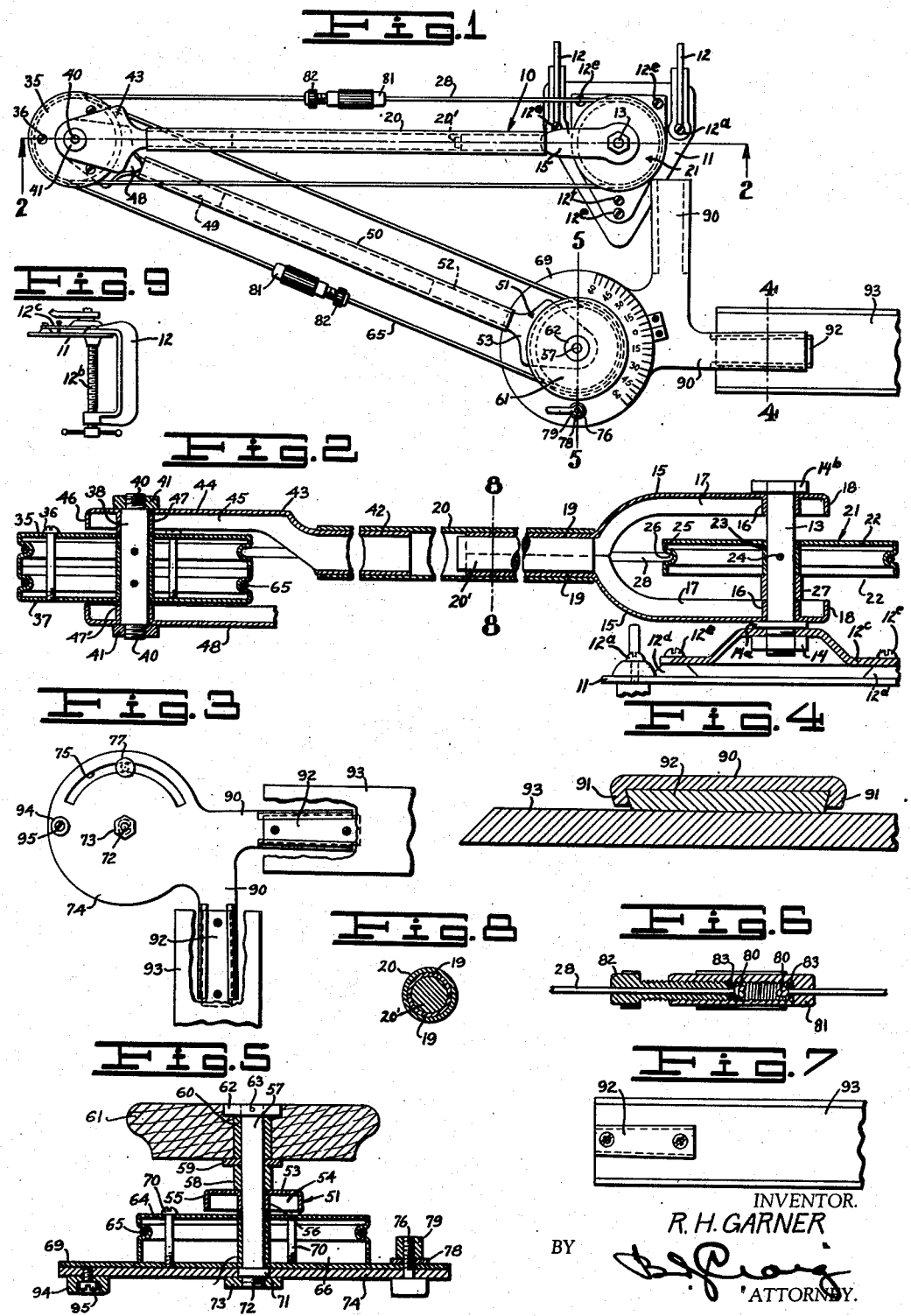
INVENTOR.
R. H. GARNER
BY
ATTORNEY.

Patented Nov. 16, 1937

2,099,266

UNITED STATES PATENT OFFICE 2,099,266

DRAFTING MACHINE

Russell H. Garner, Pasadena, Calif., assignor to Leonard N. Partch, Pasadena, and Russell H. Garner Application January 27, 1936, Serial No. 60,993

7 Claims. (Cl. 33—79)

This invention relates to drafting instruments.

The general object of the invention is to provide an improved universal drafting machine.

A further object of the invention is to provide an improved drafting machine wherein parallel movements are provided by a novel pulley arm construction wherein the parts are made of metal stampings.

A further object of the invention is to provide novel pulleys for a drafting instrument.

An additional object of the invention is to provide novel means for tightening the flexible coupling member used in a drafting machine.

Additional objects and the advantages of my invention will be apparent from the following description taken in connection with the accompanying drawing, wherein:

Fig. 1 is a top plan view of a drafting machine embodying the features of my invention;

Fig. 2 is a section taken on line 2—2 of Fig. 1;

Fig. 3 is a fragmentary bottom plan view of the scale holding member with parts broken away;

Fig. 4 is a fragmentary section taken on line 4—4 of Fig. 1;

Fig. 5 is a section taken on line 5—5 of Fig. 1;

Fig. 6 is a central sectional view through one of the cord tighteners;

Fig. 7 is a fragmentary top plan view of one of the scales; and

Fig. 8 is a section taken on line 8—8 of Fig. 2.

Referring to the drawing by reference characters I have shown my invention as embodied in a drafting machine which is indicated generally at 10. As shown this machine includes a base 11 which is substantially triangular in shape and which is provided with a pair of clamps 12. These clamps are shown as held on the base by screws 12ª although other means may be provided. The clamps include threaded members 12ᵇ which may engage a drawing table or other support to hold the machine in operative position.

On the base 11 I provide a supplemental base 12ᶜ. The base 11 is provided with protuberances 12ᵈ and the supplemental base 12ᶜ engages these protuberances. The protuberances are threaded to receive screws 12ᵉ which also engage the base 12ᶜ. An adjusting screw 12ᶠ is also provided so that when the screws 12ᵉ are loosened the screw 12ᶠ may be shifted to an adjusted position after which the screws 12ᵉ may be tightened so that the position of the supplemental base 12ᶜ relative to the base 11 can be adjusted. The supplemental base is provided with a central post 13 on the lower end of which a nut 14 is mounted. The post is provided with a washer 14ᵃ and has a head 14ᵇ thereon.

A pair of similar stamped brackets 15 which are preferably made as metal stampings are mounted on the post 13. Each of these brackets includes an aperture from which a flange 16 extends while the body of the bracket is provided with opposed flanges 17 along the sides, and with an end flange 18. The forward ends of the brackets are semi-circular as indicated at 19 (see Fig. 8) and these semi-circular portions 19 together form a cylindrical bearing which fits within a tubular arm 20. The portions 19 are held in place by a member 20′ which may be driven into place and which may be slightly tapered if desired.

Mounted upon the post 13 I show a stamped pulley 21 which comprises a disk 22 having a flange 23 thereon which is held on the post 13 by means of a pin 24. The disk 22 is provided with an external flange 25 which is provided with a circumferential recess 26. A collar 27 is disposed between the disk 22 and the flange 16 on the lower bracket 15. The brackets 15 are somewhat resilient and as a result when the parts are assembled, as shown in Fig. 2, and the nut 14 is tightened the parts are resiliently held in tightly assembled position.

A cord 28 passes over the pulley 21 and also passes over a second pulley 35. The pulley 35 is connected by screws 36 to a second pulley 37. The pulleys 35 and 37 are similar to the pulley 21 previously described.

The pulleys 35 and 37 are mounted on a second post 38 which has reduced threaded portions 40 at each end with a nut 41 engaging the threaded portions 40. The end of the arm 20 remote from the pulley 21 has a semi-cylindrical portion 42 of a stamped bracket 43 secured therein as by brazing.

The bracket member 42 includes an end portion 44 which is offset with respect to the axis of the arm 20 and is provided with opposed side flanges 45, an end flange 46, and a central flanged aperture 47. This flange 47 engages the upper end of the second post 38 while at the lower end the post 38 is engaged by a bracket 48 which is similar in all respects to the bracket 43 but which is reversely directed so that the flange 47′ is engaged by the post 38.

The second bracket 48 has a cylindrical portion 49 which is secured within one end of an arm 50 similar to the manner in which the cylindrical portion 42 of the bracket 43 is secured within the arm 20. The other end of the arm 50 is provided with a bracket 51 which is similar to the bracket 42 and which includes a cylindrical portion 52 and a body portion 53. This body portion is provided with an end flange 54, side flanges 55, and with a central aperture which includes a flange 56. This flange 56 is mounted on a third post 57.

Mounted on the post 57 is a collar 58, a washer 59, and a bearing sleeve 60. The bearing sleeve 60 is mounted in a knob 61 which is held in place by a washer 62 and a pin 63 and the construction is such that the knob 61 may be grasped and the entire drafting machine shifted and since the knob 61 is freely rotatable this may be done without rotating the post 57.

Mounted on the post 57 below the bracket 51 I show a pulley 64 which is similar in all respects to the pulley 21 previously described. This pulley 64 receives a cord 65 which also passes over the pulley 37 previously described.

The pulley 64 engages a protractor scale member 69 to which it is held by means of screws 70. The third post 57 near its lower end includes a collar 71 and the end is threaded as at 72 to receive a nut 73. The collar 71 fits within an aperture in a scale base 74 and the nut 73 holds the scale base against the protractor scale 69.

The scale base 74 is provided with an arcuate slot 75 through which a screw 76 projects. The head 77 of the screw 76 is disposed beneath the lower side of the scale base and the upper end of the screw projects through the slot and receives a clamping washer 78 and a thumb nut 79 by means of which the scale 69 may be set relative to the scale base and held in set position.

The cords 65 and 28 may be made of silk, gut, metal, or other material and the ends are preferably held in adjusted taut relation by providing knots 80 as shown in Fig. 6. One of the ends of the cord is inserted in an outer tightening member 81 and the other is inserted in an inner tightening member 82. The members 81 and 82 are in threaded engagement and the construction is such that when the members are turned relative to one another the cords 28 and 65 will be tightened or loosened. A pair of washers 83 are preferably imposed between knots 80 and their associated members.

The scale base 74 is provided with a pair of arms 90 which as shown are arranged at right angles to each other. Each of these arms includes a body having flanges 91 thereon. These flanges 91 are arranged on opposite sides of the body and are bent to form a dovetailed groove in which an attaching member 92 which is secured to a scale 93 may be inserted. The flanges 91 preferably taper in one direction and the attaching member 92 also tapers so that the parts may be held together by friction.

In order to support the arm 50 I may provide a slide member 94 which is held on the scale base by a screw 95 as shown in Fig. 5.

From the foregoing description it will be apparent that I have provided a novel drafting machine which may be economically manufactured and which is highly efficient in use.

Having thus described my invention I claim:

1. A drafting instrument comprising a base adapted to be secured to a drafting board, a post rigidly mounted on said base, a pulley on said post, said pulley having an external flange thereon, an arm, a pair of brackets each having a semi-cylindrical end portion fitted in said arm at one end, the other end of said brackets rotatably engaging said post, a second bracket on the other end of said arm, said bracket including a cylindrical portion fitted in the arm and rotatably engaging said second post, a pair of pulleys fixed on said second post, a third bracket engaging said second post, a second arm engaging said third bracket at one end, the other end of said second arm having a fourth bracket thereon, a third post rotatably engaging said fourth bracket, a pulley engaging said third post, an endless member passing over said first pulley and one of the pairs of pulleys, a second endless member passing over the other of said pair of pulleys and said third pulley, each of said endless members including an adjusting member, a scale member, a cup member engaging said scale member, means connecting said third pulley, said cup member, and said scale member, a scale base mounted on said post, said scale base having a pair of scale engaging members thereon.

2. A drafting instrument comprising a base adapted to be secured to a drafting board, a post rigidly mounted on said base, a pulley, said pulley having an internal flange fixed to said post, said pulley having external flanges thereon, an arm, a bracket comprising a pair of members each having a semi-cylindrical end portion fitted in said arm at one end, the other end of said bracket comprising two spaced apart members and being flanged and rotatably engaging said post, a second bracket on the other end of said arm, said second bracket including a cylindrical portion fitted in the arm and including a single portion including a flanged aperture rotatably engaging said second post, a pair of connected pulleys fixed on said second post, each of said second pulleys including an internal flange pinned to the post and including an external flange, a third bracket engaging said second post, a second arm engaging said third bracket at one end, the other end of said second arm having a fourth bracket thereon, a third post engaging said fourth bracket, a pulley engaging said third post, an endless member passing over said fixed pulley and one of the pairs of pulleys, a second endless member passing over the other of said pair of pulleys and said third pulley, each of said endless members including an adjusting member, said adjusting member including threaded elements with the endless members having knots therein engaging said elements, a scale member, means connecting said third pulley and said scale member, a scale base mounted on said post, said scale base having a scale engaging member thereon.

3. A drafting instrument comprising a base adapted to be secured to a drafting board, a post rigidly mounted on said base, a pulley on said post, said pulley having an external flange thereon, an arm, a pair of brackets each having a semi-cylindrical end portion fitted in said arm at one end, the other end of said brackets rotatably engaging said post, a second bracket on the other end of said arm, said bracket including a cylindrical portion fitted in the arm and rotatably engaging said second post, a pair of pulleys fixed on said second post, a third bracket engaging said second post, a second arm engaging said third bracket at one end, the other end of said second arm having a fourth bracket thereon, a third post rotatably engaging said fourth bracket, a pulley engaging said third post, an endless member passing over said first pulley and one of the pairs of pulleys, a second endless member passing over the other of said pair of pulleys and said third pulley, each of said endless members including an adjusting member, a scale member, a cup member engaging said scale member, means connecting said third pulley, said cup member, and said scale member, a scale base mounted on said post, said scale base having a slot therein and a clamping member passing through said scale and fitted in said slot, said scale base having a pair of scale engaging members thereon, said scale engaging members comprising a body having inwardly directed edge flanges thereon and a scale having a bevelled support thereon engaging said flanges.

4. A drafting instrument comprising a base adapted to be secured to a drafting board, a post rigidly mounted on said base, a pulley, an arm, a bracket comprising a pair of members each having a semi-cylindrical end portion fitted in said arm at one end, the other end of said bracket comprising two spaced apart members and being flanged and rotatably engaging said post, a second bracket on the other end of said arm, said second bracket including a cylindrical portion fitted in the arm and including a single portion including a flanged aperture rotatably engaging said second post, a pair of connected pulleys fixed on said second post, a third bracket engaging said second post, a second arm engaging said third bracket at one end, the other end of said second arm having a fourth bracket thereon, a third post engaging said fourth bracket, a pulley engaging said third post, an endless member passing over said fixed pulley and one of the pairs of pulleys, a second endless member passing over the other of said pair of pulleys and said third pulley, each of said endless members including an adjusting member, said third pulley having a cup member thereon, a scale member, said cup member engaging said scale member, means connecting said third pulley, said cup member, and said scale member, a scale base mounted on said post, said scale base having a pair of scale engaging members thereon.

5. A drafting instrument comprising a base adapted to be secured to a drafting board, a post rigidly mounted on said base, a pulley, said pulley having an internal flange fixed to said post, said pulley having external flanges thereon, an arm, a bracket comprising a pair of members each having a semi-cylindrical end portion fitted in said arm at one end, the other end of said bracket comprising two spaced apart members and being flanged and rotatably engaging said post, a second bracket on the other end of said arm, said second bracket including a cylindrical portion fitted in the arm and including a single portion including a flanged aperture rotatably engaging said second post, a pair of connected pulleys fixed on said second post, each of said second pulleys including an internal flange pinned to the post and including an external flange, a third bracket engaging said second post, a second arm engaging said third bracket at one end, the other end of said second arm having a fourth bracket thereon, a third post engaging said fourth bracket, a pulley engaging said third post, an endless member passing over said fixed pulley and one of the pairs of pulleys, a second endless member passing over the other of said pair of pulleys and said third pulley, each of said endless members including an adjusting member, said adjusting member including threaded elements with the endless members having knots therein engaging said elements, said third pulley having a cup member thereon, a scale member, said cup member engaging said scale member, means connecting said third pulley, said cup member, and said scale member, a scale base mounted on said post, said scale base having a slot therein and a clamping member passing through said scale and fitted in said slot, said scale base having a pair of scale engaging members thereon, said scale engaging members comprising a body having inwardly directed edge flanges thereon and a scale having a bevelled support thereon engaging said flanges.

6. In a mounting for a universal drafting machine, a lower base adapted to be secured to a drawing board, an auxiliary base spaced above and substantially parallel to said lower base, means to hold said auxiliary base above said lower base, said means comprising three threaded members extending through said auxiliary base and engaging said lower base and tending to draw said bases together, a fourth threaded member adjacent one of said first mentioned threaded members tending to force said bases apart, and a post projecting above said auxiliary base.

7. A drafting instrument comprising a base adapted to be secured to a drafting board, a post rigidly mounted on said base, a pair of bracket members, each of said bracket members including flange portions engaging said post at spaced points, a pulley on said post between said bracket members, a cylindrical arm, each of said bracket members including a semi-cylindrical portion fitting within said arm, a second post, a second flanged bracket having a cylindrical portion fitting within the other end of said arm and having a portion engaging one end portion of said second post, a pair of pulleys fixed on said second post, a third flanged bracket engaging the other end portion of said second post, a second cylindrical arm, said third bracket having a cylindrical portion fitting within said second arm, a fourth bracket having a cylindrical portion fitting the other end portion of said second arm, a third post, said third post engaging said fourth bracket, a pulley engaging said third post, an endless member passing over said first pulley and one of the pair of pulleys, a second endless member passing over the other of said pair of pulleys and said third pulley, a scale member, means connecting said third pulley and said scale member and a scale base mounted on said third post.

RUSSELL H. GARNER.